United States Patent
Ganesh et al.

(10) Patent No.: US 12,237,691 B2
(45) Date of Patent: Feb. 25, 2025

(54) AGGREGATED WIRELESS POWER TRANSFER WITH MULTIPLE COILS AND COMMUNICATION CHANNELS

(71) Applicant: GE Hybrid Technologies, LLC, Niskayuna, NY (US)

(72) Inventors: Jayanti Ganesh, Bangalore (IN); Viswanathan Kanakasabai, Bangalore (IN)

(73) Assignee: Dolby Laboratories Inc., San Francisco, CA (US)

( * ) Notice: Subject to any disclaimer, the term of this patent is extended or adjusted under 35 U.S.C. 154(b) by 316 days.

(21) Appl. No.: 17/755,978

(22) PCT Filed: Nov. 20, 2020

(86) PCT No.: PCT/US2020/061581
§ 371 (c)(1),
(2) Date: May 13, 2022

(87) PCT Pub. No.: WO2021/102310
PCT Pub. Date: May 27, 2021

(65) Prior Publication Data
US 2022/0416581 A1    Dec. 29, 2022

(30) Foreign Application Priority Data
Nov. 21, 2019  (IN) .............................. 201911047528

(51) Int. Cl.
*H02J 50/10* (2016.01)
*H02J 50/40* (2016.01)
(Continued)

(52) U.S. Cl.
CPC .............. *H02J 50/10* (2016.02); *H02J 50/40* (2016.02); *H02J 50/60* (2016.02); *H02J 50/80* (2016.02)

(58) Field of Classification Search
CPC .. H02J 50/10; H02J 50/40; H02J 50/60; H02J 50/80; H02J 7/00034; H02J 50/90;
(Continued)

(56) References Cited

U.S. PATENT DOCUMENTS 9,231,411 B2    1/2016  Baarman et al.
10,998,776 B2 *  5/2021  Chen .......................... H02J 7/02
(Continued)

FOREIGN PATENT DOCUMENTS

CN         107947286       4/2018
JP         2011205767      10/2011
(Continued)

OTHER PUBLICATIONS

"China patent application No. 202080093826.0 Second Office Action", Apr. 10, 2024, 13 pages.
(Continued)

*Primary Examiner* — Richard Tan
(74) *Attorney, Agent, or Firm* — DeLizio, Peacock, Lewin & Guerra, LLP

(57) ABSTRACT

This disclosure provides systems, devices, apparatus and methods, including computer programs encoded on storage media, for wireless power transmission. A wireless power transmission apparatus may transmit multiple wireless power signals to a wireless power reception apparatus configured to combine the power from the multiple wireless power signals. The wireless power reception apparatus may provide a combined wireless power signal to a load such as a battery charger or electronic device. In some implementations, each set of primary coil and secondary coil may utilize low power wireless power signals (such as 15 Watts or less) in accordance with a wireless charging standard. By combining power from multiple low power wireless power signals, the wireless power reception apparatus may support (Continued)

higher power requirements of an electronic device. Multiple communication channels may be established between the wireless power transmission apparatus and the wireless power reception apparatus.

31 Claims, 11 Drawing Sheets

(51) Int. Cl.
  *H02J 50/60* (2016.01)
  *H02J 50/80* (2016.01)
(58) Field of Classification Search
  CPC ............ H02J 7/00304; H02J 7/00308; H02J 7/00309; H02J 7/0048; H02J 50/12; H02J 50/402; H04B 5/79; H04B 5/263; H04B 5/72
  USPC ........................................................ 307/104
  See application file for complete search history.

(56) References Cited

U.S. PATENT DOCUMENTS

| 11,424,623 | B2* | 8/2022 | Partovi | ............... H01F 38/14 |
| 2008/0298100 | A1 | 12/2008 | Esaka et al. | |
| 2010/0194336 | A1* | 8/2010 | Azancot | ............... H02J 50/40 |
| | | | | 381/74 |
| 2012/0139358 | A1 | 6/2012 | Teggatz et al. | |
| 2014/0266031 | A1 | 9/2014 | Sasaki | |
| 2016/0285317 | A1 | 9/2016 | Maniktala | |
| 2018/0301937 | A1* | 10/2018 | Park | .................. H02J 50/12 |
| 2019/0058360 | A1 | 2/2019 | Garbus et al. | |
| 2019/0123581 | A1 | 4/2019 | Wang et al. | |
| 2022/0271571 | A1* | 8/2022 | Yang | .................. H02J 50/12 |

FOREIGN PATENT DOCUMENTS

| JP | 2014069239 | | 4/2014 |
| JP | 2014522630 | | 9/2014 |
| JP | 2017149600 | | 8/2017 |
| JP | 2017169277 | | 9/2017 |
| JP | 2018207670 | | 12/2018 |
| JP | 2019127114 | | 8/2019 |
| WO | WO2012114822 | * | 8/2012 |

OTHER PUBLICATIONS

"China patent application No. 202080093826.0 First Office Action", Oct. 26, 2023, 6 pages.
"PCT Application No. PCT/US2020/061581 International Search Report and Written Opinion", Feb. 10, 2021, 16 pages.
"China patent application No. 202080093826.0 3rd Office Action", Jul. 29, 2024, 12 pages.
"Japanese App No. 2022528537 First Office Action", Oct. 15, 2024.
"Vietnam app No. 85447/SHTT-SC Written Opinion", Aug. 30, 2024, 2 pages.

* cited by examiner

AGGREGATED WIRELESS POWER TRANSFER WITH MULTIPLE COILS AND COMMUNICATION CHANNELS

CROSS-REFERENCE TO RELATED APPLICATIONS

This Patent Application is a National Stage of International Application No. PCT/US2020/061581, filed Nov. 20, 2020, and claims the benefit of priority to India Provisional Patent Application No. 201911047528, filed Nov. 21, 2019, entitled "AGGREGATED WIRELESS POWER TRANSFER WITH MULTIPLE COILS AND COMMUNICATION CHANNELS," and assigned to the assignee hereof, the disclosures of which are incorporated herein by reference.

TECHNICAL FIELD

This disclosure relates generally to wireless power, and more specifically, to aggregated wireless power transfer using multiple coils and communication channels.

DESCRIPTION OF THE RELATED TECHNOLOGY

Conventional wireless power systems have been developed with a primary objective of charging a battery in a wireless power reception apparatus, such as a mobile device, a small electronic device, gadget, or the like. In a conventional wireless power system, a wireless power transmission apparatus may include a primary coil that produces an electromagnetic field. The electromagnetic field may induce a voltage in a secondary coil of a wireless power reception apparatus when the secondary coil is placed in proximity to the primary coil. In this configuration, the electromagnetic field may transfer power to the secondary coil wirelessly. The power may be transferred using resonant or non-resonant inductive coupling between the primary coil and the secondary coil. The wireless power reception apparatus may use the received power to operate or may store the received energy in a battery for subsequent use. Traditional techniques for wireless power transfer may not provide sufficient power for newer electronic devices. It is desirable to increase the reliability and amount of power that can be wirelessly transferred to an electronic device.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented in a wireless power transmission apparatus. In some implementations, the wireless power transmission apparatus may include a plurality of primary coils for transmission of wireless power to different secondary coils of a wireless power reception apparatus. The plurality of primary coils may include at least a first primary coil and a second primary coil. The wireless power transmission apparatus may include a power signal generator electrically connected to the plurality of primary coils and configured to selectively provide power to the plurality of primary coils. The wireless power transmission apparatus may include a transmission (TX) controller coupled with the power signal generator and the plurality of primary coils. The TX controller may be configured to control an amount of power provided by the power signal generator to the plurality of primary coils.

In some implementations, the wireless power transmission apparatus may include one or more communication units communicatively coupled with the TX controller and configured to communicate with the wireless power reception apparatus. The one or more communication units may enable communication via at least a first communication channel at the first primary coil and a second communication channel at the second primary coil.

In some implementations, the one or more communication units may be configured to receive a first communication from the wireless power reception apparatus via the first communication channel at the first primary coil. The one or more communication units may be configured to receive a second communication from the wireless power reception apparatus via the second communication channel at the second primary coil.

In some implementations, the first communication and the second communication are received at different times.

In some implementations, the first communication includes a first identifier for identifying the first communication channel, and the second communication includes a second identifier for identifying the second communication channel.

In some implementations, the TX controller may be configured to detect a foreign object at either the first primary coil or the second primary coil based on the first communication or the second communication, respectively.

In some implementations, the TX controller may be configured to determine a first quality factor (Q-factor) for the first primary coil, determine a second Q-factor for the second primary coil, obtain a first reference quality value from the first communication, and obtain a second reference quality value from the second communication. The TX controller may be configured to detect the foreign object based on either a first comparison of the first Q-factor with the first reference quality value or a second comparison of the second Q-factor with the second reference quality value.

In some implementations, the TX controller may be configured to obtain, from the first communication, a first received power metric regarding wireless power received from the first primary coil by a first secondary coil of the wireless power reception apparatus. In some implementations, the TX controller may be configured to obtain, from the second communication, a second received power metric regarding wireless power received from the second primary coil by a second secondary coil of the wireless power reception apparatus. The TX controller may be configured to determine a first transmitted power metric for the first primary coil and determine a second transmitted power metric for the second primary coil. The TX controller may be configured to detect the foreign object based on either a first comparison of the first transmitted power metric with the first received power metric or a second comparison of the second transmitted power metric with the second received power metric.

In some implementations, the first communication may include a first received power metric regarding wireless power received from the first primary coil by a first secondary coil of the wireless power reception apparatus. The second communication may include a second received power metric regarding wireless power received from the second primary coil by a second secondary coil of the wireless power reception apparatus.

In some implementations, the one or more communication units may be further configured to transmit a third communication to the wireless power reception apparatus via either or both of the first primary coil and the second primary coil.

In some implementations, the first communication and the second communication may be received by demodulating amplitude load modulation signals. The third communication may be transmitted by modulating the wireless power using frequency modulation.

In some implementations, the amplitude load modulation signals may include amplitude shift keying (ASK) modulation. The frequency modulation includes frequency shift keying (FSK) modulation.

In some implementations, each primary coil may be configured to produce an electromagnetic field for the inductive transmission of wireless power not exceeding 15 Watts. The plurality of primary coils may collectively enable wireless power transmission over 15 Watts.

In some implementations, the plurality of primary coils may include at least four primary coils and the plurality of primary coils may collectively enable wireless power transmission of at least 60 Watts.

In some implementations, the wireless power transmission apparatus may include one or more switches electrically coupled to at least one primary coil of the plurality of primary coils. The one or more switches may be selectively opened by the TX controller to disable the at least one primary coil if the at least one primary coil is not transmitting wireless power to the wireless power reception apparatus or if a foreign object is detected between the at least one primary coil and the wireless power reception apparatus.

In some implementations, each primary coil is compatible with a power class zero (PC0) rating, and the plurality of primary coils collectively enable wireless power transmission for a power class one (PC1) rating.

In some implementations, the plurality of primary coils is configured to provide power via more than one primary coil when the wireless power reception apparatus has a PC1 rating power requirement. In some implementations, the plurality of primary coils is configured to provide power via one primary coil when the wireless power reception apparatus has a PC0 rating power requirement.

In some implementations, the TX controller is configured to identify whether the wireless power reception apparatus has the PC0 rating power requirement or the PC1 rating power requirement based, at least in part, on a communication received from the wireless power reception apparatus via at least one of the plurality of primary coils.

In some implementations, the wireless power transmission apparatus may include a charging surface associated with the plurality of primary coils. The wireless power transmission apparatus may include one or more alignment aids to increase a likelihood that a plurality of secondary coils in the wireless power reception apparatus will correspondingly align with the plurality of primary coils when the wireless power reception apparatus is placed on the charging surface.

Another innovative aspect of the subject matter described in this disclosure can be implemented in a wireless power reception apparatus. In some implementations, the wireless power reception apparatus may include a plurality of secondary coils. Each secondary coil may be configured to receive wireless power from a different primary coil of a wireless power transmission apparatus. The plurality of secondary coils may include at least a first secondary coil and a second secondary coil. The wireless power reception apparatus may include a power combination circuit electrically coupled to the plurality of secondary coils and configured to combine the wireless power from the first secondary coil and the second secondary coil. The power combination circuit may be configured to provide the combined wireless power to at least a first load.

In some implementations, the wireless power reception apparatus may include a receive (RX) controller coupled with the power combination circuit and the plurality of secondary coils. In some implementations, the wireless power reception apparatus may include the one or more communication units communicatively coupled with the RX controller and configured to communicate with the wireless power transmission apparatus. The one or more communication units may enable communication via at least a first communication channel at the first secondary coil and a second communication channel at the second secondary coil.

In some implementations, the one or more communication units are configured to transmit a first communication to the wireless power transmission apparatus via the first communication channel at the first secondary coil and transmit a second communication to the wireless power transmission apparatus via the second communication channel at the second secondary coil.

In some implementations, the first communication and the second communication are transmitted at different times.

In some implementations, the first communication includes a first identifier for identifying the first communication channel, and wherein the second communication includes a second identifier for identifying the second communication channel.

In some implementations, the first communication includes a first received power metric regarding wireless power received from a first primary coil of the wireless power transmission apparatus by the first secondary coil, and wherein the second communication includes a second received power metric regarding wireless power received from a second primary coil of the wireless power transmission apparatus by the second secondary coil.

In some implementations, the one or more communication units are further configured to receive a third communication from the wireless power transmission apparatus via either or both of the first secondary coil and the second secondary coil.

In some implementations, the first communication and the second communication are transmitted by modulating amplitude load modulation signals, and wherein the third communication is received by demodulating the wireless power using frequency modulation.

In some implementations, the amplitude load modulation signals include amplitude shift keying (ASK) modulation, and the frequency modulation includes frequency shift keying (FSK) modulation.

In some implementations, each secondary coil is configured to receive wireless power not exceeding 15 Watts via an electromagnetic field produced by a different primary coil of the wireless power transmission apparatus, and wherein the plurality of secondary coils collectively receive wireless power over 15 Watts.

In some implementations, the plurality of secondary coils includes at least four secondary coils and the plurality of secondary coils collectively receive wireless power of at least 60 Watts.

In some implementations, each secondary coil is compatible with a power class zero (PC0) standard specification, and wherein the plurality of secondary coils collectively receives wireless power for a power class one (PC1) standard specification.

In some implementations, the wireless power reception apparatus may include a housing for the plurality of secondary coils, the housing configured to attach to an electronic device. The load may include a battery charger of the electronic device.

In some implementations, the wireless power reception apparatus may include one or more alignment aids to increase a likelihood that the plurality of secondary coils will correspondingly align with a plurality of primary coils associated with a charging surface of the wireless power transmission apparatus when the wireless power reception apparatus is placed on the charging surface.

Another innovative aspect of the subject matter described in this disclosure can be implemented in a method performed by a wireless power transmission apparatus. In some implementations, the method may include generating, by a power signal generator, a power signal and providing the power signal to a plurality of primary coils. The method may include transmitting, by the plurality of primary coils, the power signal as wireless power to different secondary coils of a wireless power reception apparatus. The plurality of primary coils may include at least a first primary coil and a second primary coil. The method may include controlling an amount of power generated by the power signal generator.

In some implementations, the method may include communicating with the wireless power reception apparatus via at least a first communication channel at the first primary coil and a second communication channel at the second primary coil.

In some implementations, the method may include receiving a first communication from the wireless power reception apparatus via the first communication channel at the first primary coil and receiving a second communication from the wireless power reception apparatus via the second communication channel at the second primary coil.

In some implementations, the first communication and the second communication are received at different times.

In some implementations, the first communication includes a first identifier for identifying the first communication channel, and the second communication includes a second identifier for identifying the second communication channel.

In some implementations, the method may include detecting a foreign object at either the first primary coil or the second primary coil based, at least in part, on the first communication or the second communication, respectively.

In some implementations, the first communication includes a first received power metric regarding wireless power received from the first primary coil by a first secondary coil of the wireless power reception apparatus, and the second communication includes a second received power metric regarding wireless power received from the second primary coil by a second secondary coil of the wireless power reception apparatus.

In some implementations, the method may include transmitting a third communication to the wireless power reception apparatus via either or both of the first primary coil and the second primary coil.

In some implementations, the first communication and the second communication are received by demodulating amplitude load modulation signals, and wherein the third communication is transmitted by modulating the wireless power using frequency modulation.

In some implementations, the amplitude load modulation signals include amplitude shift keying (ASK) modulation, and wherein the frequency modulation includes frequency shift keying (FSK) modulation.

In some implementations, each primary coil is compatible with a power class zero (PC0) standard specification, and wherein the plurality of primary coils collectively enables wireless power transmission tier a power class one (PC1) standard specification.

In some implementations, the method may include selectively opening one or more switches coupled to the plurality of primary coils to disable the at least one primary coil if the at least one primary coil is not transmitting wireless power to the wireless power reception apparatus or if a foreign object is detected between the at least one primary coil and the wireless power reception apparatus.

Another innovative aspect of the subject matter described in this disclosure can be implemented in a method performed by a wireless power reception apparatus. In some implementations, the method may include receiving, by a plurality of secondary coils, wireless power from a wireless power transmission apparatus. Each secondary coil may be configured to receive wireless power from a different primary coil of the wireless power transmission apparatus. The plurality of secondary coils may include at least a first secondary coil and a second secondary coil. The method may include combining, by a power combination circuit the wireless power from the first secondary coil and the second secondary coil to form a combined wireless power. The method may include providing the combined wireless power to at least a first load.

In some implementations, the method may include communicating with the wireless power transmission apparatus via at least a first communication channel at the first secondary coil and a second communication channel at the second secondary coil.

In some implementations, the method may include transmitting a first communication to the wireless power transmission apparatus via the first communication channel at the first secondary coil and transmitting a second communication to the wireless power transmission apparatus via the second communication channel at the second secondary coil.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
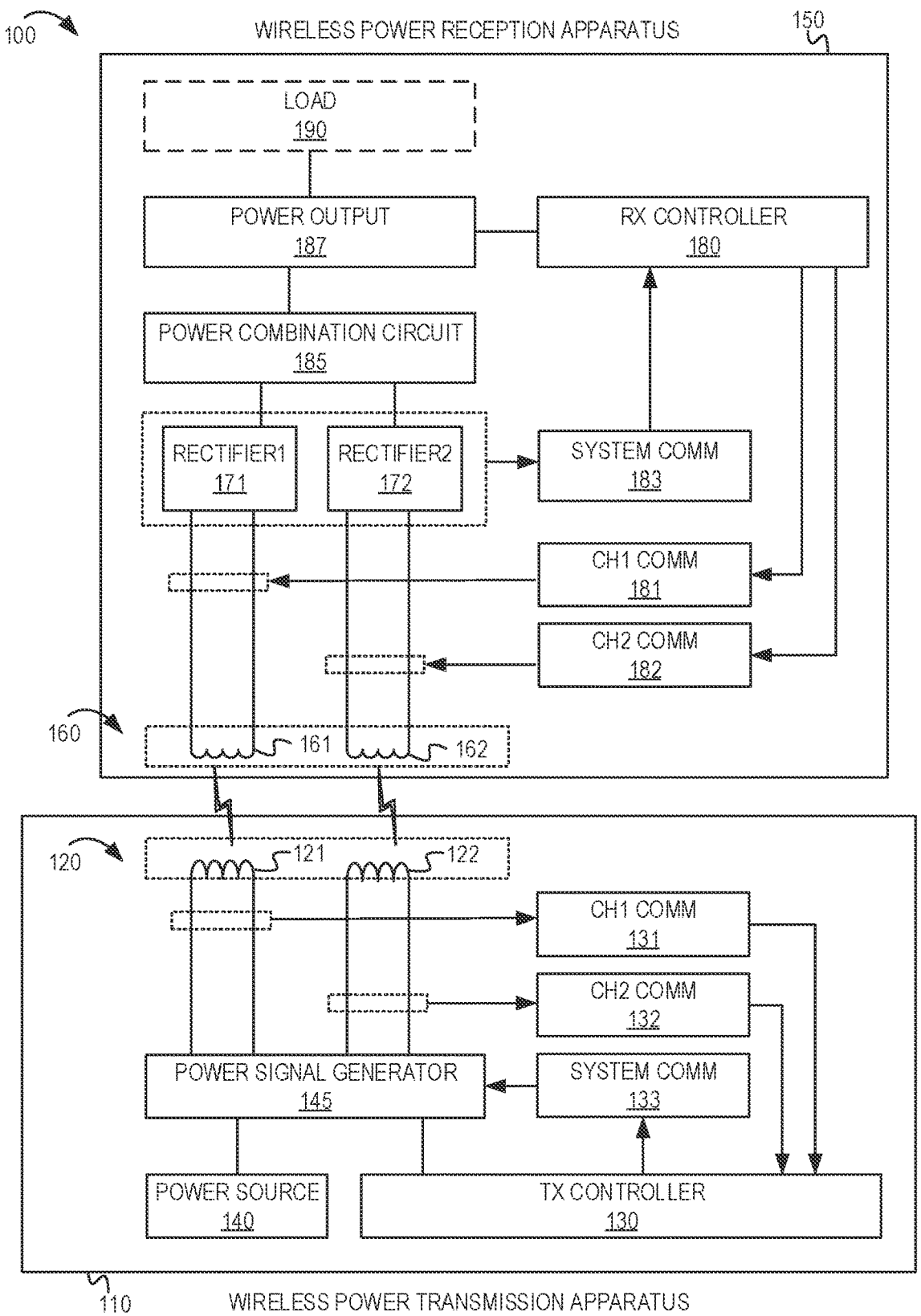
FIG. 1 shows an overview of components associated with an example wireless power system according to some implementations.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for transmitting or receiving wireless power.

A traditional wireless power system may include a wireless power transmission apparatus and a wireless power reception apparatus. The wireless power transmission apparatus may include a primary coil that transmits wireless energy (as a wireless power signal) to a corresponding secondary coil in the wireless power reception apparatus. A primary coil refers to a source of wireless energy (such as inductive or magnetic resonant energy) in a wireless power transmission apparatus. A secondary coil is located in a wireless power reception apparatus and receives the wireless energy. In some traditional wireless power systems, a primary coil can transfer wireless energy to a secondary coil up to a rating predetermined by a wireless standard. For example, a low power wireless power signal may convey 5 Watts (5 W), 9 W, 12 W, or 15 W. A power class zero (PC0) is defined by the Wireless Power Consortium (WPC), a standards development group, as a wireless power system that can support up to a rating of 15 Watts of wireless power transfer. Therefore, a low power wireless power system may deliver up to 15 Watts of energy which is suitable for many electronic devices.

Higher power wireless systems are being developed to support wireless power transmission to electronic devices that require more power (greater than 15 W). For example, a laptop computer, monitor, appliance, or other electronic device may use 65 W, 90 W or 120 W. A power class one (PC1) is defined by the WPC as a wireless power system that can support a rating above 15 W of wireless power transfer. A concern with higher power wireless systems is the amount of electromagnetic interference (EMI) that high power wireless systems may cause. Undesirable EMI or radiation may be caused by excess magnetic flux that is not linked to the secondary coil. Furthermore, using a larger primary coil and larger secondary coil may support higher power transfer but results in reduced sensitivity for foreign object detection. For example, a larger primary coil may be less capable of detecting a small foreign object. Furthermore, a larger primary coil may result in a lower tolerance for misalignment as compared to a smaller primary coil.

Various implementations relate generally to the use of multiple primary coils to concurrently transmit wireless power to different secondary coils. In accordance with this disclosure, a wireless power system may utilize multiple primary coils and secondary coils to transfer wireless power from a wireless power transmission apparatus to a wireless power reception apparatus. For example, each primary coil may transmit a low power signal (15 W or less) to a corresponding secondary coil. The wireless power reception apparatus may combine wireless power from multiple secondary coils to provide a high-power wireless power to a load. For example, a wireless power reception apparatus may combine 15 W from each of six secondary coils to provide a 90 W power signal to an electronic device.

In some implementations, the wireless power transmission apparatus and the wireless power reception apparatus may be manufactured according to a standardized wireless power specification, such as the Qi® specification developed by the WPC. For example, the wireless power transmission apparatus may include multiple primary coils, where each primary coil may conform to a PC0 design of the Qi specification. The wireless power reception apparatus may include multiple secondary coils, where each secondary coil may conform to a PC0 design of the Qi specification. Thus, a PC1 power requirement (above 15 W) may be met by combining multiple PC0 wireless power channels.

In some implementations, a wireless power transmission apparatus with multiple PC0 primary coils may provide flexibility to wirelessly power different types of wireless power reception apparatuses. For example, if the wireless power reception apparatus has one PC0 secondary coil and is placed on one PC0 primary coil (of the wireless power transmission apparatus), the wireless power transmission apparatus can supply wireless power according to a traditional PC0 system. However, if the wireless power reception apparatus has multiple PC0 secondary coils (which can be combined to support a PC1 rating), the wireless power transmission apparatus may use multiple PC0 primary coils coupled to multiple PC0 secondary coils (or the wireless power reception apparatus) to supply wireless power to support the PC1 rating. In some implementations, a wireless power transmission apparatus may support the concurrent charging of multiple PC0 wireless power reception apparatuses or a combination of PC0 and PC1 wireless power reception apparatuses.

In some implementations, the wireless power transmission apparatus and the wireless power reception apparatus may communicate via a plurality of communication channels. For example, a first communication channel may include a first primary coil of the wireless power transmission apparatus and a first secondary coil of the wireless power reception apparatus. The first communication channel may be used for communication from the wireless power reception apparatus to the wireless power transmission apparatus using amplitude load modulation (such as amplitude shift keying) at the first secondary coil. A second communication channel may include a second primary coil of the wireless power transmission apparatus and a second secondary coil of the wireless power reception apparatus. The wireless power reception apparatus may communicate to the wireless power transmission apparatus using amplitude load modulation at the second secondary coil. For forward communication (from the wireless power transmission apparatus to the wireless power reception apparatus), the wireless power transmission apparatus may use frequency modulation of the signal applied to the primary coils. This disclosure includes several examples of communication channels and communications that may be performed using amplitude modulation, frequency modulation, or both.

The communication channels may be used to communicate information regarding identification information, capabilities, charging status, and control signals, among other examples. For example, the wireless power reception apparatus may transmit information about the receiver type, power capability, number of secondary coils, identifications of the secondary coils (such an identifier (ID) tags), load voltage, charging status, and received power from each of secondary coil. The wireless power reception apparatus may transmit control signals or messages to request adjustments of power levels.

In some implementations, a communication path from the wireless power reception apparatus to the wireless power transmission apparatus may be referred to as a backward communication path. In contrast, a communication path from the wireless power transmission apparatus to the wireless power reception apparatus may be referred to as a forward communication path. The wireless power transmission apparatus may use one or more forward communication paths to communicate information about the transmitter capability, power transmission operating points, and responses to control signals. For example, the wireless power transmission apparatus may use different responses to indicate whether the wireless power transmission apparatus acknowledges, rejects, or does not understand the control or information signals from the wireless power reception apparatus In some implementations, each backward or forward communication path may be associated with a channel ID (also referred to as a tag ID) that uniquely identifies a transmission coil pair (formed by a primary coil and a corresponding secondary coil). The channel ID or tag ID may be included in communications between the wireless power reception apparatus and the wireless power transmission apparatus so that power metrics, reference values, quality measurements, or other information may be specific to a transmission coil pair.

In some implementations, such as the illustrative examples of this disclosure, one or more forward communication paths may use a first type of modulation and one or more backward communication paths may use a second type of modulation. For example, frequency-shift-keying (FSK) modulation may be used on a forward communication path, while amplitude-shift-keying (ASK) modulation may be used on a backward communication path. The types of modulation described in this application are for illustrative purposes and alternative types of modulation may be used within the scope of this disclosure.

In some implementations, the designs in this disclosure may improve foreign object detection. For example, foreign object detection may be performed independently for each transmission coil pair (primary coil and corresponding secondary coil). For example, the communication channels may be used to communicate reference quality factors, received power metrics, or other information that is related to each transmission coil pair. The information for each PC0 transmission coil pair may be used to detect foreign objects or inefficient alignment of the coil pairs. Unlike single-coil PC1 designs, the designs in this disclosure use multiple PC0 channels in which wireless power transfer is distributed by multiple PC0 transmission coil pairs. As a result, each PC0 transmission coil pair may have more sensitivity to foreign objects than would be realized by a large coil pair distributing a higher power in a single PC1 channel. The higher sensitivity to foreign object detection for PC0 transmission coil pairs is advantageous in detecting foreign objects near the transmission coil pairs. Furthermore, in some implementations, one or more of the PC0 primary coils may be disabled after detecting a foreign object while other ones of the PC0 primary coils may continue to transfer wireless power if the foreign object is not impacting their corresponding PC0 channels.

Particular implementations of the subject matter described in this disclosure can be implemented to realize one or more of the following potential advantages. In some implementations, the described techniques can be used to combine wireless power received from multiple secondary coils to generate a high-power output to a load. The wireless power system may cause less EMI and provide better efficiency of wireless power transfer compared to conventional wireless power systems that use only one wireless power signal. The electronics in both the wireless power transmission apparatus and wireless power reception apparatus can utilize a modular design with components having a smaller power rating. Advantageously, implementations of this disclosure can support higher power for appliances and electronic devices that require greater amounts of power. Cost and complexity of the wireless power system may be reduced by using multiple low power wireless power signals to accommodate a greater wireless power transfer. Furthermore, the use of multiple communication channels may support better in-band communication for robust foreign object detection and sensitivity.

FIG. 1 shows an overview of components associated with an example wireless power system according to some implementations. The wireless power system 100 includes a wireless power transmission apparatus 110 which has multiple primary coils 120. Each of the primary coils 120 may be associated with a power signal generator. For example, a first primary coil 121 may be electrically coupled with a power signal generator 145. Each primary coil may be a wire coil which transmits a wireless power signal (which also may be referred to as wireless energy or an electromagnetic field). The primary coil may transmit wireless energy using inductive or magnetic resonant field. The power signal generator may include components (not shown) to prepare the wireless power signal. For example, the power signal generator 145 may include one or more switches, drivers, a capacitor in series with each coil, or other components. The wireless power transmission apparatus 110 may include a power source 140 which is configured to provide power to the power signal generator 145. The power source 140 may convert alternating current (AC) to direct current (DC). The power source 140 may be internal or external to the wireless power transmission apparatus 110. In some implementations, the primary coils 120 may be coupled with the power signal generator 145 via one or more switches so that each primary coil can be enabled or disabled independently by the TX controller 130.

The primary coils 120 may be managed by one or more controllers (such as a transmit (TX) controller 130) that control whether the primary coil is transmitting wireless power. In FIG. 1, the TX controller 130 may manage the power signal generator 145 and also may manage one or more switches (not shown) that enable or disable particular primary coils. The TX controller 130 also may be communicatively coupled with one or more communication units, such as a first channel communication unit 131, a second channel communication unit 132 and a system communication unit 133. The communication units 131, 132, and 133 may be external to the TX controller 130 (as shown) or may be internal or implemented in the TX controller 130.

In some implementations, each primary coil may be associated with a different driver, voltage regulator, and the like. In some implementations, each primary coil may be coupled with separate circuit components like a capacitor (in series with the primary coil), a current sensing resistor, or other elements. The TX controller 130 may determine whether to cause a particular primary coil to transmit wireless power. For example, the TX controller 130 may periodically activate one or more switches that are associated with each primary coil (and series capacitor) to excite (or briefly energize) the primary coil. The TX controller 130 may perform a coil current sensing process to determine if a wireless power reception apparatus is located near the primary coil. If a wireless power reception apparatus is detected, the TX controller 130 may activate one or more switches associated with the primary coil to cause the primary coil to transmit wireless power.

The controller (such as the TX controller 130) may be configured to detect e presence or proximity of a wireless power reception apparatus. For example, the TX controller 130 may cause one or more primary coils to periodically transmit a detection signal and measure for a change in coil current or load that indicates an object near the primary coil. In some implementations, the TX controller 130 may detect a ping, wireless communication, load modulation, or the like, to determine that a secondary coil of a wireless power reception apparatus is near the primary coil.

FIG. 1 also shows a wireless power reception apparatus 150. A wireless power reception apparatus may be any type of device capable of receiving wireless power, including a mobile phone, computer, laptop, peripheral, gadget, robot, vehicle, or the like. The wireless power reception apparatus 150 may have an array of secondary coils 160, including a first secondary coil 161 and a second secondary coil 162. The secondary coils 160 may each be capable of receiving wireless power from a different primary coil. For example, when the first secondary coil 161 is positioned near the first primary coil 121, the first secondary coil 161 may receive wireless power from the first primary coil 121. During a detection phase, the first primary coil 121 may transmit a detection signal (which also may be referred to as a ping). The coil current at the first primary coil 121 may be measured to determine whether the coil current has crossed a threshold indicating an object in the electromagnetic field of the first primary coil 121. If an object is detected, the TX controller 130 (or the first channel communication unit 131) may wait for a handshake signal from the wireless power reception apparatus 150 (such as a signal strength packet, an identification signal, or a setup signal, among other examples) to determine whether the object is a wireless power reception apparatus or a foreign object. The handshake signal may be communicated by the wireless power reception apparatus 150 using a series of load changes (such as load modulations). The load changes may be detectable by a sensing circuit and interpreted by the first primary coil 121. In some implementations, the load changes are created by load amplitude modulation using a first channel communication unit 181 of the wireless power reception apparatus 150. The first channel communication unit 131 may interpret the variations in the load to recover the communication from the wireless power reception apparatus 150. The communication may include information such as charging level, requested voltage, received power, receiver power capability, support for a wireless charging standard, or the like.

In the wireless power reception apparatus 150, each of the secondary coils 160 may be part of separate receive (RX) circuits. For example, each RX circuit may include one or more secondary coils, a rectifier, DC capacitors, and other elements (not shown). Each secondary coil 160 that is properly aligned may generate an induced voltage based on the received wireless power signal from one of the primary coils 120. A capacitor (not shown) may be in series between the secondary coil and the rectifier. The rectifier may rectify the voltage and provide voltage to a power combination circuit 185 that combines power from multiple secondary coils. The power combination circuit 185 may provide a combined wireless power to a load 190, such as a battery module (not shown). The load 190 may be in the wireless power reception apparatus 150 or may be an external device that is coupled by an electrical interface, such as a power output 187 of the wireless power reception apparatus 150. The load 190 may include a charger stage, protection circuits such as a temperature-detecting circuit, and overvoltage and overcurrent protection circuits.

In some implementations, the wireless power transmission apparatus 110 or the wireless power reception apparatus 150 may have an alignment mechanism to ensure that the plurality of secondary coils 160 and the plurality of primary coils 120 align properly. The alignment mechanism may include a physical guide, tray, magnetic alignment, or socket, among other examples. In some implementations, a fixed alignment may ensure that multiple primary coils and multiple secondary coils are aligned to support a high aggregate wireless power transfer from the plurality of primary coils 120 to the plurality of secondary coils 160.

Returning to the communication capabilities, the wireless power transmission apparatus 110 may have a receive (RX) controller that monitors the power combination circuit 185 and communicates information about the load or charging state. The RX controller 180 may communicate using a first channel communication unit 181, a second channel communication unit 182, or both. Similarly, the RX controller 180 may receive communications from the wireless power transmission apparatus 110 via a system communication unit 183. The system communication unit 183 may sense the voltage at the AC terminals of one or both of the rectifiers 171 and 172. In some implementations, the forward communication path (from the system communication unit 133 via the power signal generator 145 to the rectifiers 171 and 172 and the system communication unit 183) may be used for communications from the wireless power transmission apparatus 110 to the wireless power reception apparatus 150. Backward communication paths (such as a first path that includes the first channel communication unit 181 and the first channel communication unit 131) may be used for communications from the wireless power reception apparatus 150 to the wireless power transmission apparatus 110. A second path may include the second channel communication unit 182 and the second channel communication unit 132. The first and second backward communication paths may be used for quality metrics or received power metrics regarding a particular pair of primary coil and secondary coil.

In several examples of this disclosure, the backward communication paths may use ASK modulation and the forward communication paths may use FSK modulation. The types of modulation for each path may be different or reversed, so long as the modulation used in the backward communication path and the forward communication path do not interfere with the other. Furthermore, while several examples show the use of a single forward communication path, in some implementations, each transmission coil pair (formed by a primary coil and a secondary coil) may create separate forward and backward communication paths.

Figure 2:
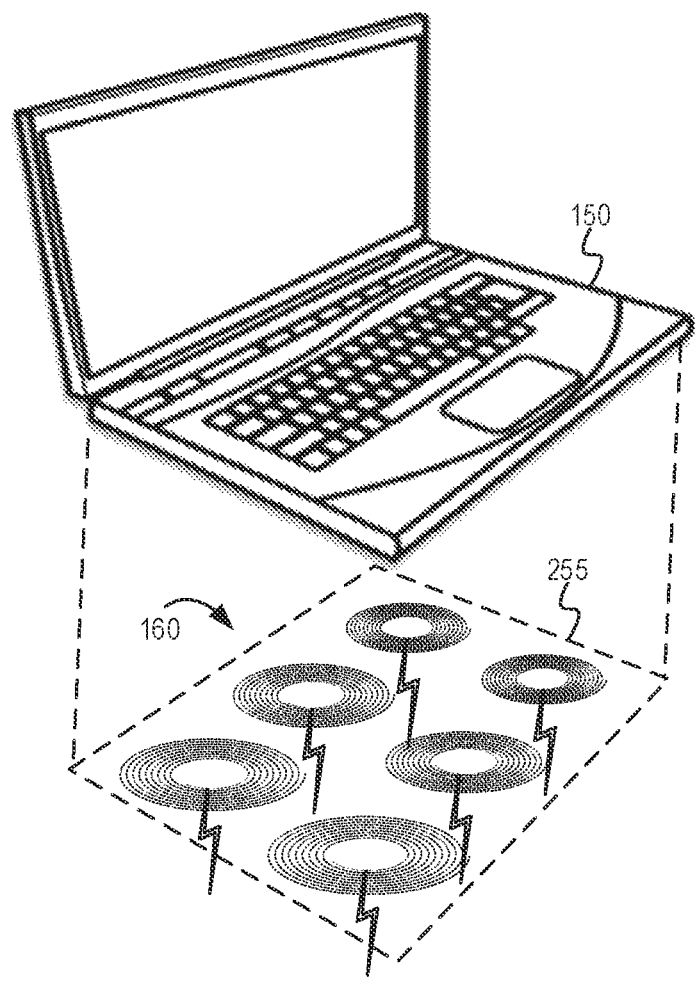
FIG. 2 shows a pictorial diagram of an example wireless power reception apparatus having multiple secondary coils for receiving wireless power from a wireless power transmission apparatus according to some implementations.

FIG. 2 shows a pictorial diagram of an example wireless power reception apparatus 150 having multiple secondary coils for receiving wireless power from a wireless power transmission apparatus according to some implementations. The quantity and arrangement of secondary coils are provided as an example. Other quantities of secondary coils, number of layers, or arrangements may be possible. Although shown as a laptop, the wireless power reception apparatus 150 may be any type of electronic device. Furthermore, the wireless power reception apparatus 150 may be a component integrated into the electronic device or may be an external component or attachment that couples to the electronic device. In FIG. 2, the wireless power reception apparatus 150 may be manufactured so that it can be positioned on a charging surface (not shown) such that a plurality of secondary coils 160 are configured to receive wireless power. Inside the wireless power reception apparatus 150 (such as inside a bottom surface portion 255 of the laptop), there are a plurality of secondary coils 160 for receiving wireless power.

When a secondary coil and a primary coil are aligned for the transfer of wireless power, they may form a transmission coil pair. Each transmission pair of coils may transfer wireless power according to a technical standard specification. In some implementations, each transmission coil pair may be a PC0 design that conforms to a low power transfer rate of the technical standard specification. By combining power from multiple PC0 transmission coil pair, the wireless power reception apparatus 150 may receive a higher aggregated amount of wireless power, such as those required for a PC1 design.

There may be various ways to align the wireless power reception apparatus 150 with a wireless power transmission apparatus so that the plurality of secondary coils 160 can align with a corresponding plurality of primary coils in the wireless power transmission apparatus. In some implementations, the wireless power transmission apparatus 110 or the wireless power reception apparatus 150 (or both) may include an alignment aid to increase the likelihood that the plurality of secondary coils 160 will be aligned with the corresponding plurality of primary coils when the wireless power reception apparatus 150 is placed on a charging surface of the wireless power transmission apparatus 110. The alignment aid may include any one or a combination of a magnetic alignment, a physical structure, visual markers, an optical alignment aid, a sound alignment aid, or the like.

Figure 3:
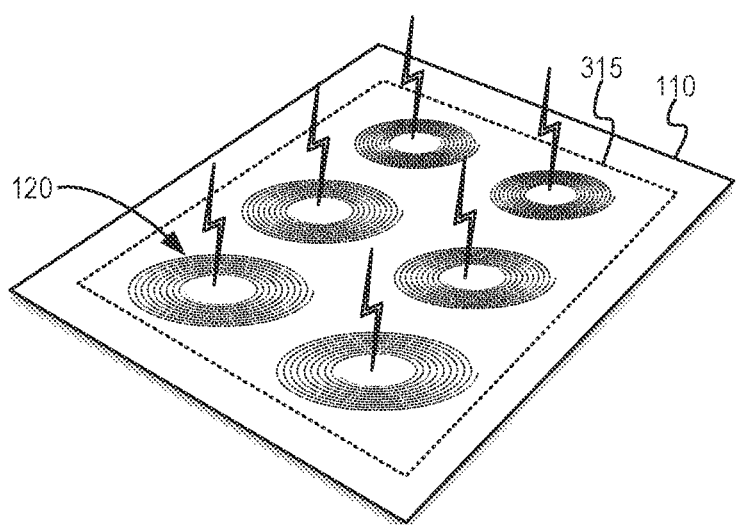
FIG. 3 shows a pictorial diagram of an example wireless power transmission apparatus having multiple primary coils for transmitting wireless power to a wireless power reception apparatus according to some implementations.

FIG. 3 shows a pictorial diagram of an example wireless power transmission apparatus having multiple primary coils for transmitting wireless power to a wireless power reception apparatus according to some implementations. The example wireless power transmission apparatus 110 includes 6 primary coils (shown in portion 315). The quantity and arrangement of primary coils are provided as an example. Other quantities of primary coils, number of layers, or arrangements may be possible. A charging surface may house the primary coils. The wireless power reception apparatus may be placed on the charging surface 315. A first set of primary coils 120 may be activated to transmit wireless power to corresponding secondary coils (not shown) in the wireless power reception apparatus.

In some implementations, the wireless power transmission apparatus or the wireless power reception apparatus (or both) may implement overlapping coils. The pattern of overlapping coils may reduce an amount of area where a wireless power signal is exposed (or not aligned with a secondary coil). This may have the result of reducing EMI. Alternatively, or additionally, the coils may be spaced apart so that the plurality of coils may be energized without impacting a nearby coil. For example, in some implementations, a distance between the centers of any two primary coils may be greater than 1.5 times the maximum diameter of the largest primary coil.

By using multiple primary coils 120 to transmit wireless power, the aggregate wireless power transmitted may be higher while maintaining a lower amount of wireless power contributed by each primary coil. Lower power transmission for each primary coil may reduce the amount of EMI and other interference to other components of the wireless power reception apparatus (or the electronic device which it powers). Thus, in some implementations, the use of multiple transmission coil pairs may be superior to the use of a single large coil to transmit a high-power wireless signal.

The wireless power transmission apparatus 110 may be constructed with grooves, notches, magnets, or line markers, among other examples, to aid in the alignment of one or more wireless power reception apparatuses. For example, an alignment design may permit a single wireless power reception apparatus to be placed on the charging surface 315 such that the plurality of primary coils 120 are aligned with a corresponding plurality of secondary coils in the wireless power reception apparatus. Alternatively, or additionally, the charging surface 315 may support wireless charging for different sizes of wireless power reception apparatuses. For example, the charging surface 315 may be used with a wireless power reception apparatus that support either or both of a PC0 design or a PC1 design. In some implementations, a phone or other small electronic device may receive wireless power from a subset of the plurality of primary coils 120 according to a PC0 design. A laptop or other larger electronic device may receive wireless power from a larger subset or all of the plurality of primary coils 120 according to a PC1 design that aggregates wireless power from multiple PC0 transmission coil pairs.

Figure 4:
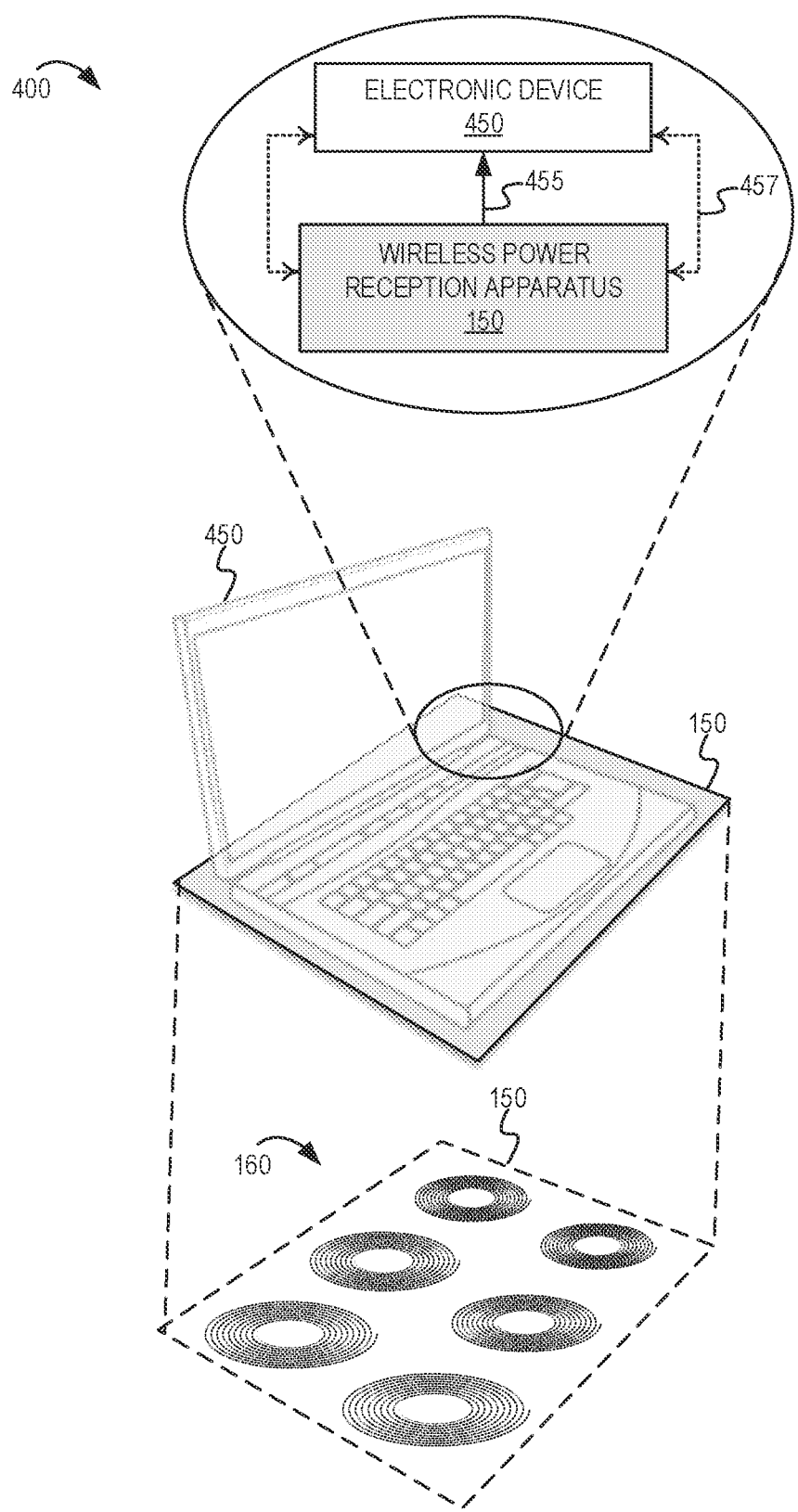
FIG. 4 shows a pictorial diagram of an example wireless power system in which a wireless power reception apparatus is configured to provide power to an electronic device according to some implementations.

FIG. 4 shows a pictorial diagram of an example wireless power system 400 in which a wireless power reception apparatus is configured to provide power to an electronic device according to some implementations. In FIG. 4, the wireless power reception apparatus 150 may be a wireless power pad that has multiple secondary coils 160. In the example of FIG. 4, the secondary coils are arranged in a non-overlapping pattern. The wireless power reception apparatus 150 may have an electrical interface 455 or other connection that provides power from the wireless power reception apparatus 150 to the electronic device 450. In some implementations, a fastener 457 (such as a clip, magnet, button, casing, or the like) may be used to physical couple the wireless power reception apparatus 150 to the electronic device 450. The fastener 457 may be part of the wireless power reception apparatus 150, the electronic device 450, or both. For example, the wireless power reception apparatus 150 include a housing that contains the secondary coils, and the housing may attach to a laptop or tablet.

Figure 5:
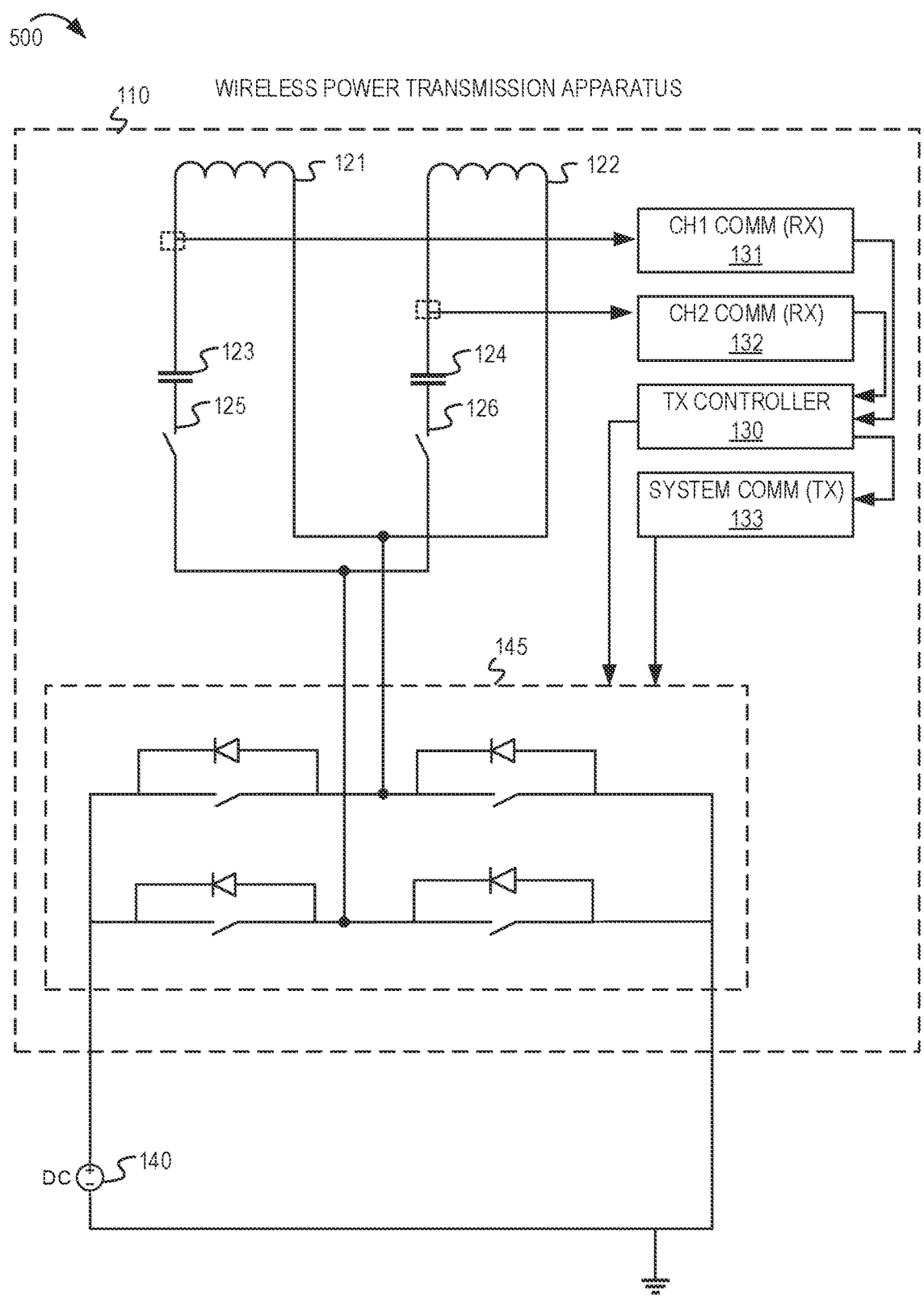
FIG. 5 shows a block diagram of an example wireless power transmission apparatus according to some implementations.

FIG. 5 shows a block diagram 500 of an example wireless power transmission apparatus 110 according to some implementations. A first primary coil 121 may have a capacitor 123 and a switch 125 for selectively enabling or disabling the wireless power transmission via the first primary coil 121. Similarly, a second primary coil 122 may have a capacity 124 and switch 126. The quantity of primary coils shown in FIG. 5 is for illustrative purposes, and other designs may use a larger quantity of primary coils (not shown). In some implementations, each of the primary coils may transmit power according to a PC0 design, while the aggregate amount of wireless power transmitted may support a PC1 or greater wireless power requirement. A TX controller 130 may control the switches 125 and 126 as well as the amount of power generated by a power signal generator 145. The power signal generator 145 is expanded to show an example of the circuitry with may include diodes and switches. The TX controller 130 may control the switches in the power signal generator 145 to manage the amount or frequency of voltage, among other things.

A system communication unit 133 may use frequency modulation (such as frequency shift keying (FSK) modulation) at the power signal generator 145 to communicate via a forward communication path. A first channel communication unit 131 and a second channel communication unit 132 may be coupled to at least one portion of the first primary coil 121 and the second primary coil 122, respectively. The first channel communication unit 131 and the second channel communication unit 132 may include amplitude demodulators (such as amplitude shift keying (ASK) demodulators) to receive load modulation communications via the respective primary coils 121 and 122.

In the design shown in FIG. 5, there may be two backward communication paths (using the first channel communication unit 131 and the second channel communication unit 132) and one forward communication path (using the system communication unit 133). In other configurations, there may be separate communication units (similar to the system communication unit 133) for each of the primary coils 121 and 122.

Figure 6:
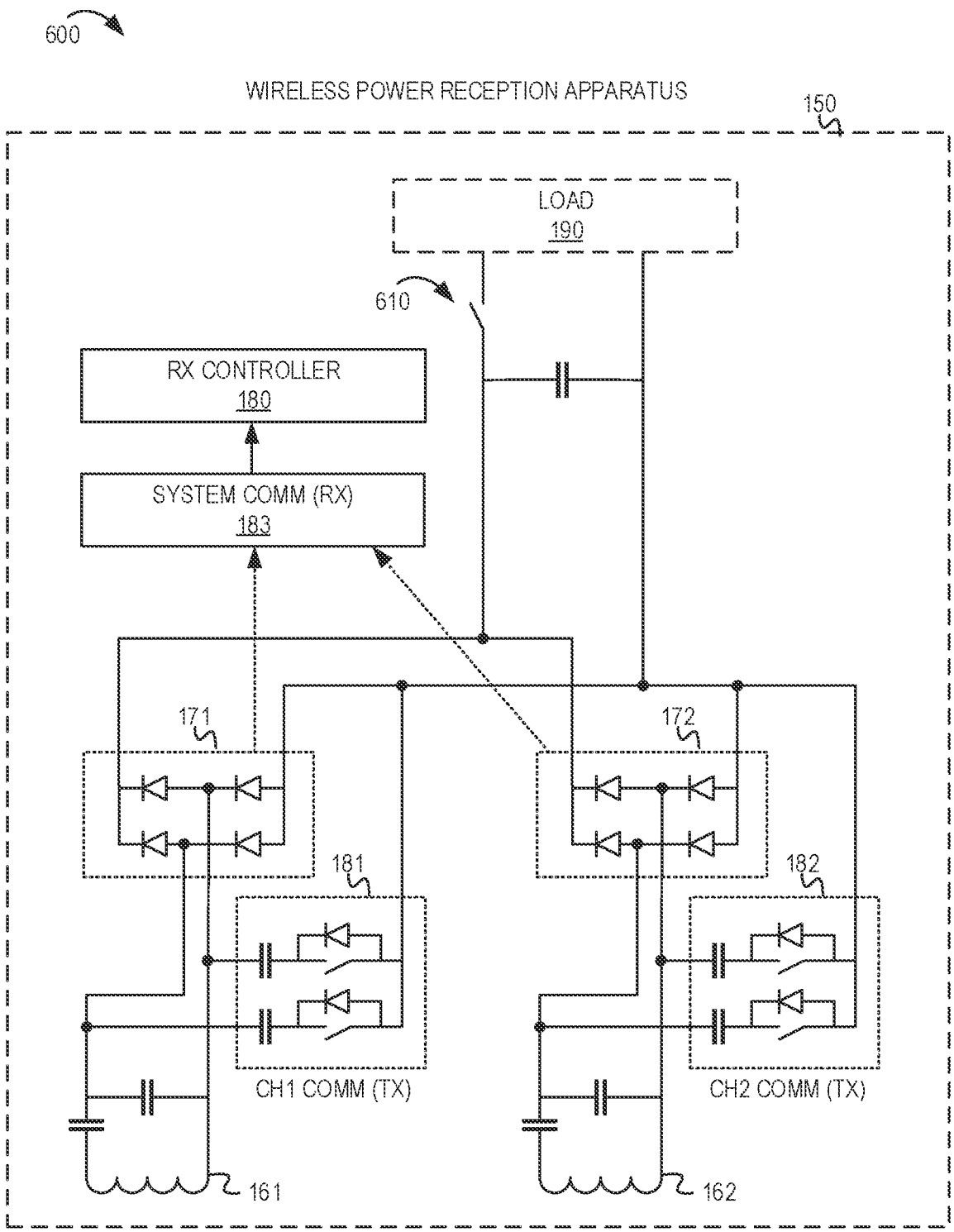
FIG. 6 shows a block diagram of an example wireless power reception apparatus according to some implementations.

FIG. 6 shows a block diagram 600 of an example wireless power reception apparatus 150 according to some implementations. A first secondary coil 161 may have a first channel communication unit 181 that includes an amplitude modulator. The RX controller 180 may control the switches in the first channel communication unit 181 to create load modulation to communicate via a first channel (that includes the first secondary coil 161) to the wireless power transmission apparatus. Similarly, a second secondary coil 162 may have a separate second channel communication unit 182 with an amplitude modulator controlled by the RX controller 180 for a second channel. Each of the secondary coils 161 and 162 may be connected to a corresponding rectifier 171 and 172, respectively. A switch 610 in the wireless power reception apparatus 150 may be capable of disconnecting the load. For example, load may be disconnected to enable calibration of the system for detecting a foreign object before power transfer, to isolate the system during any faults on the load side, to protect the load from faults on in the system, or to keep the load disconnected until the initial handshake with the wireless power transmission apparatus is complete, among other examples.

A system communication unit 183 may be coupled to AC terminals of either or both of the rectifiers 171 and 172. The system communication unit 183 may receive and demodulate frequency modulation (such as FSK) communications from a corresponding modulator of a wireless power transmission apparatus (such as the one shown in FIG. 5). Thus, the system communication unit 183 may receive forward path communications (from the wireless power transmission apparatus to the wireless power reception apparatus 150). The system communication unit 183 may send the received communications to the RX controller 180. The RX controller 180 may have control lines (not shown) to each of the first channel communication unit 181 and the second channel communication unit 182 and use the channel communication units for backward communication paths to the wireless power transmission apparatus.

Figure 7:
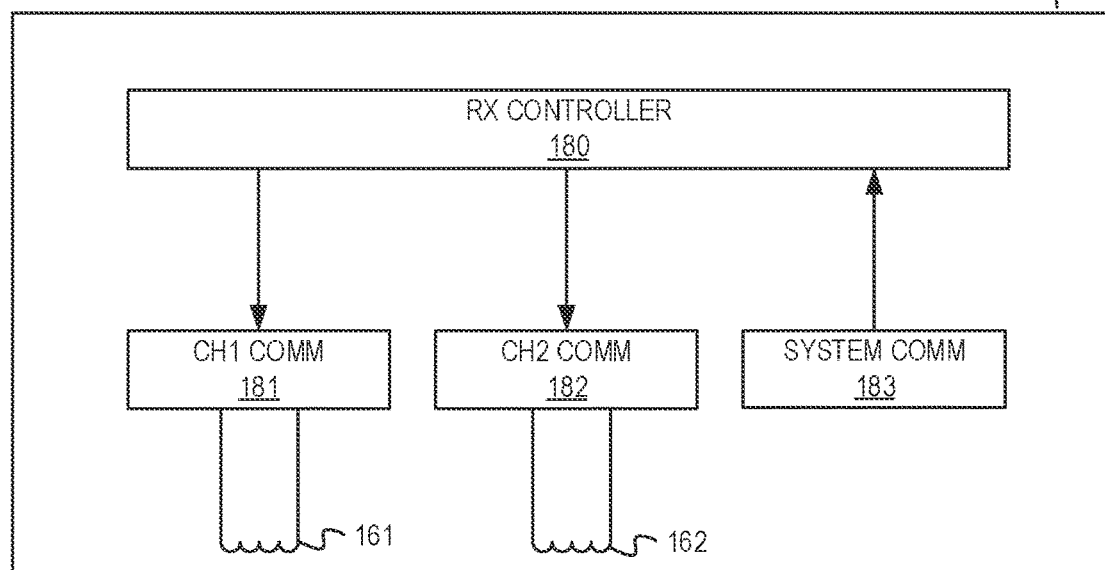
FIG. 7 shows an example of multiple communication channels between an example wireless power reception apparatus and an example wireless power transmission apparatus according to some implementations.
Figure 7:
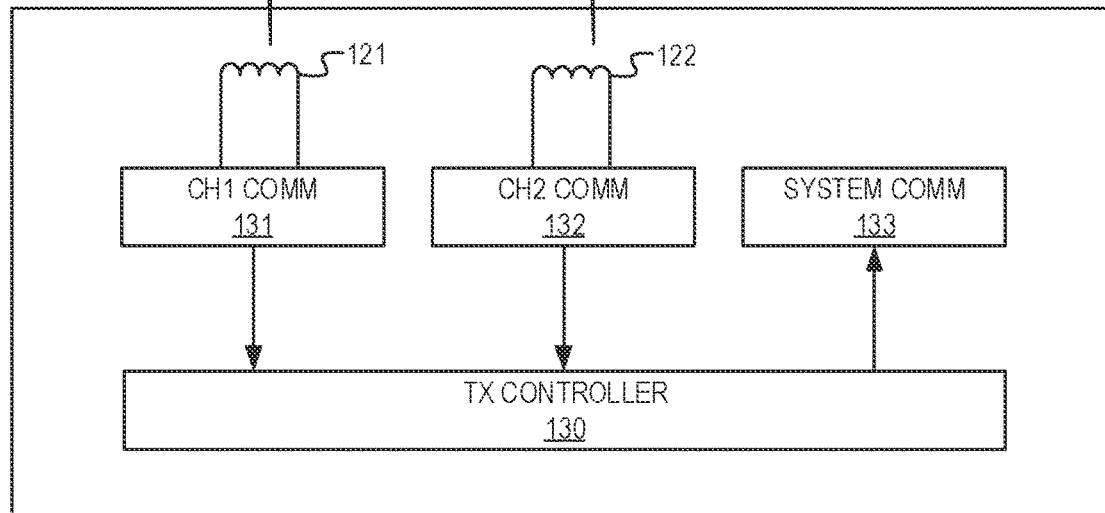

FIG. 7 shows an example 700 of multiple communication channels between an example wireless power reception apparatus and an example wireless power transmission apparatus according to some implementations. A first communication channel 751 (using back channel load modulation) may include a first secondary coil 161 and a first primary coil 121. The first communication channel 751 may use amplitude modulation (such as ASK modulation). A second communication channel 752 may include a second secondary coil 162 and a second primary coil 122. The second communication channel 752 may also use amplitude modulation. Both the first and second communication channels 751 and 752 may be referred to as backward channels since they provide a technique for communication from the wireless power reception apparatus 150 to the wireless power transmission apparatus 110. A third communication channel 753 may be referred to as a forward channel since it provides a technique for communication from the wireless power transmission apparatus 110 to the wireless power reception apparatus 150. The third communication channel 753 may include frequency modulation (such as FSK modulation) of the wireless signal. The third communication channel 753 may use either or both of the primary coils 121 and 122 to transmit FSK modulated communications that can be picked up by the secondary coils 161 and 162, respectively.

Figure 8:
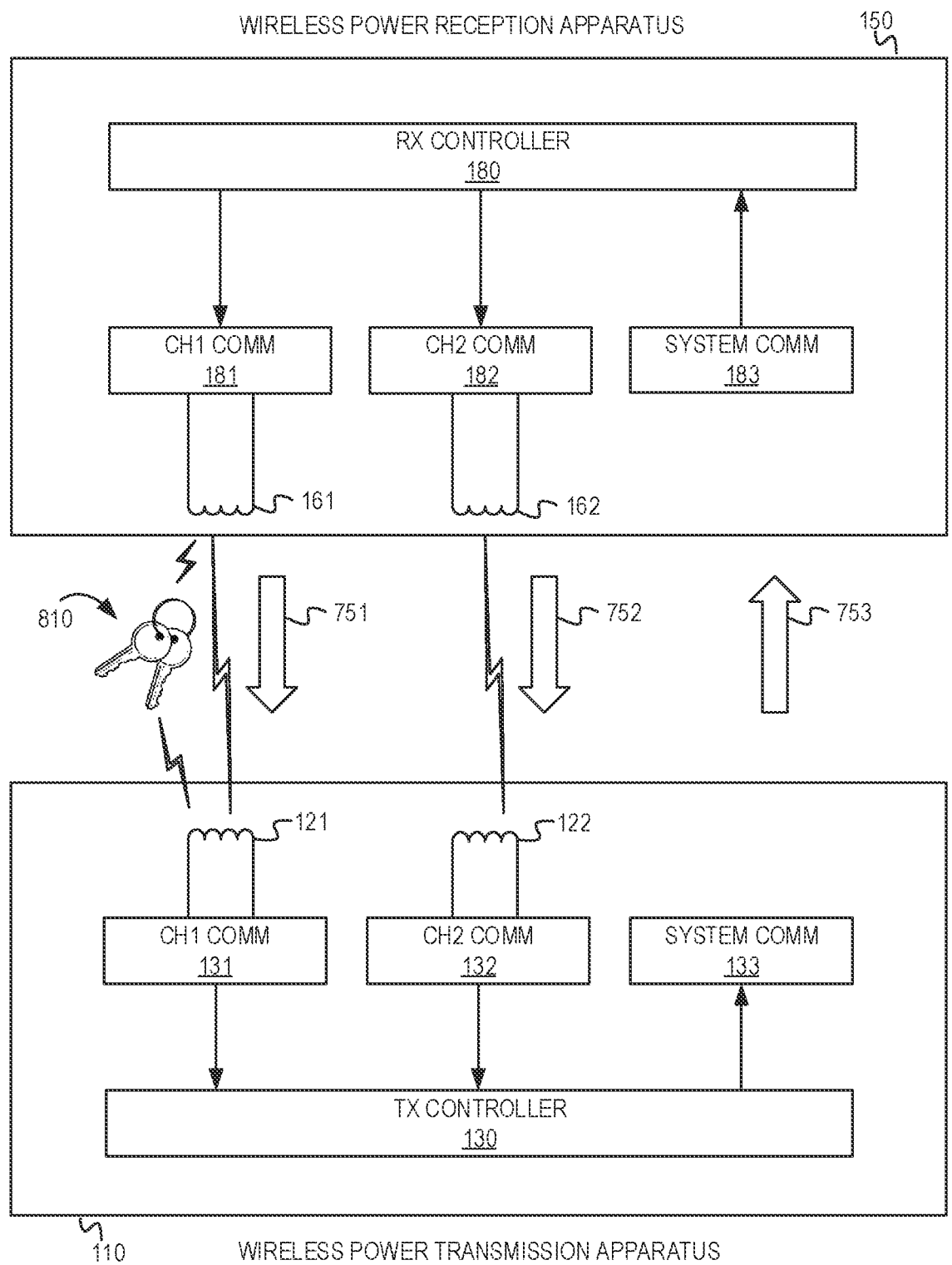
FIG. 8 shows example processes for foreign object detection based on the example communication channels described with reference to FIG. 7.

FIG. 8 shows example processes for foreign object detection based on the example communication channels described with reference to FIG. 7. FIG. 8 includes the same elements as described in FIG. 8, with the addition of a foreign object 810 in proximity to PC0 transmission coil pair that includes the first primary coil 121 and the first secondary coil 161. The foreign object 810 may be any type of object which impacts the transmission of wireless power via a transmission coil pair, such as keys, paper clips, magnets, or wires, among other examples. For example, the foreign object 810 may have ferrite or metallic properties that impact electromagnetic waves used for wireless power transfer. FIG. 8 can be used to describe at least two example processes for foreign object detection.

A first process for foreign object detection may be based on a quality factor measurement performed prior to a power transfer phase. Typically, prior to the power transfer phase, a wireless power reception apparatus 150 and a wireless power transmission apparatus 110 may exchange some information regarding quality factor of power transfer. A change in the environment of the primary coil (such as the presence of a foreign object) may cause the inductance measured at the primary coil terminals to decrease or its equivalent series resistance to increase, or both. These effects of the environment may lead to a decrease in a primary coil's quality factor (Q-factor). To enable the wireless power transmission apparatus 110 to determine if a measured Q-factor decrease is due to the combination of a wireless power reception apparatus 150 and a foreign object 810, the wireless power reception apparatus 150 may provide the wireless power transmission apparatus 110 with a reference quality factor. The reference quality factor consists of the lab tested ideal Q-factor that can be measured at the terminals of a standard test power transmitter's primary coil if the wireless power reception apparatus 150 is correctly aligned and no foreign object is nearby. The reference quality factor is based on the quality of the wireless power reception apparatus 150 due to calibration or manufacturing process. The wireless power reception apparatus 150 may store the reference quality factor and send the reference quality factor in a communication to the wireless power transmission apparatus 110 before a power transfer phase. In this disclosure, each secondary coil 161 and 162 may communicate their reference quality factors via the backward communication channel 751 and 752, respectively. The TX controller 130 of the wireless power transmission apparatus 110 can compare the reference quality factors for the secondary coils 161 and 162 against a measured Q-factor for the corresponding primary coils 121 and 122. For example, for each primary coil, upon the detection of presence of a receiver, the TX controller 130 may determine the Q-factor as a ratio of the voltage across the primary coil to the voltage applied to a resonant tank on the transmitter side. The TX controller 130 can compare each Q-factor with the reference quality factor from the wireless power reception apparatus for each corresponding secondary coil. In the example of FIG. 8, the Q-factor for the first primary coil 121 may be significantly lower than the reference quality factor for the first secondary coil 161 due the presence of the foreign object 810. Conversely, if the foreign object 810 does not impact the transmission coil pair that includes the second primary coil 122 and the second secondary coil 162, then the Q-factor for the second primary coil 122 may be approximate to the reference quality factor for the second secondary coil 162.

When the Q-factor for the first primary coil 121 is lower than the reference quality factor for the first secondary coil 161 by a threshold amount, the TX controller 130 may determine that the foreign object 810 is present near that first transmission coil pair. When the Q-factor for the second primary coil 122 is not lower than the reference quality factor for the second secondary coil 162 by the threshold amount, the TX controller 130 may determine that the foreign object 810 is not present near that second transmission coil pair. Thus, the TX controller 130 can detect foreign objects separately for each transmission coil pair. The Q-factor sensitivity (variation) in the presence of a foreign object 810 may be higher for each PC0 transmission coil pair than the Q-factor sensitivity would be for a PC1 transmission coil pair using larger coils. The higher sensitivity to Q-factor variation for PC0 transmission coil pairs is advantageous in detecting foreign objects near the transmission coil pairs. In response to detecting the foreign object 810 near the first transmission coil pair, the TX controller 130 may disable the first primary coil 121. If the foreign object 810 does not impact the second transmission coil pair, the TX controller 130 may maintain wireless power transfer via the second primary coil 122.

A second process for foreign object detection may be based on power loss accounting during a power transfer phase. For example, during the power transfer phase, the RX controller 180 may measure the voltage and current of wireless power received at each secondary coil 161 and 162. The measurements at each secondary coil 161 and 162 may be used to determine power metrics regarding the power that each secondary coil is receiving from the corresponding primary coils 121 and 122 of the wireless power transmission apparatus 110. The RX controller 180 may cause the communication channel units 181 and 182 to communicate power metrics via the first communication channel 751 and the second communication channel 752, respectively. For example, the first channel communication unit 181 may communicate a first power metric packet via the first communication channel 751. The first power metric packet may include a first power metric based on the power received by the first secondary coil 161. The second channel communication unit 182 may communicate power metric packet via the second communication channel 752. The second power metric packet may include a second power metric based on the power received by the first secondary coil 161.

The first channel communication unit 131 and the second channel communication unit 132 may demodulate the first and second power metric packets, respectively. In some implementations, the power metric packets may include a channel ID or tag ID which uniquely identifies each transmission coil pair (or the communication paths 751 and 752). The TX controller 130 may measure the voltage and current for each primary coil 121 and 122 to determine the transmitted power that each primary coil 121 and 122 is transmitting. For each transmission coil pair, the TX controller 130 can compare the magnitude of the transmitted power and the received power metric. The difference between the magnitudes of the transmitted power and the received power metric may represent a power loss due to misalignment or presence of a foreign object. For example, the foreign object 810 may absorb some of the power transmitted by the first primary coil 121. The power metric for the first secondary coil 161 may be lower than the magnitude of the transmitted power measured for the first primary coil 121. If the difference exceeds a threshold, then the TX controller 130 may determine the presence of the foreign object 810 near the coil pair that includes the first primary coil 121 and the first secondary coil 161. Meanwhile, the power metric for the second secondary coil 162 may be within a threshold amount of the transmitted power value for the second primary coil 122.

Other techniques for foreign object detection may be possible due to the availability of different communication channels, channel IDs, or tag IDs associated with each transmission coil pair. Due to the ability to detect foreign objects at different coil pairs, unaffected coil pairs may continue while the affected coil pairs may be disabled. This flexibility and sensitivity are not possible in PC1 systems that use only a single large primary coil and single large secondary coil. Thus, the ability to use combined power transferred by multiple PC0 transmission coil pairs may improve foreign object detection and flexibility for the wireless power transfer, even for a wireless power reception apparatus that requires a PC1 power rating.

Figure 9:
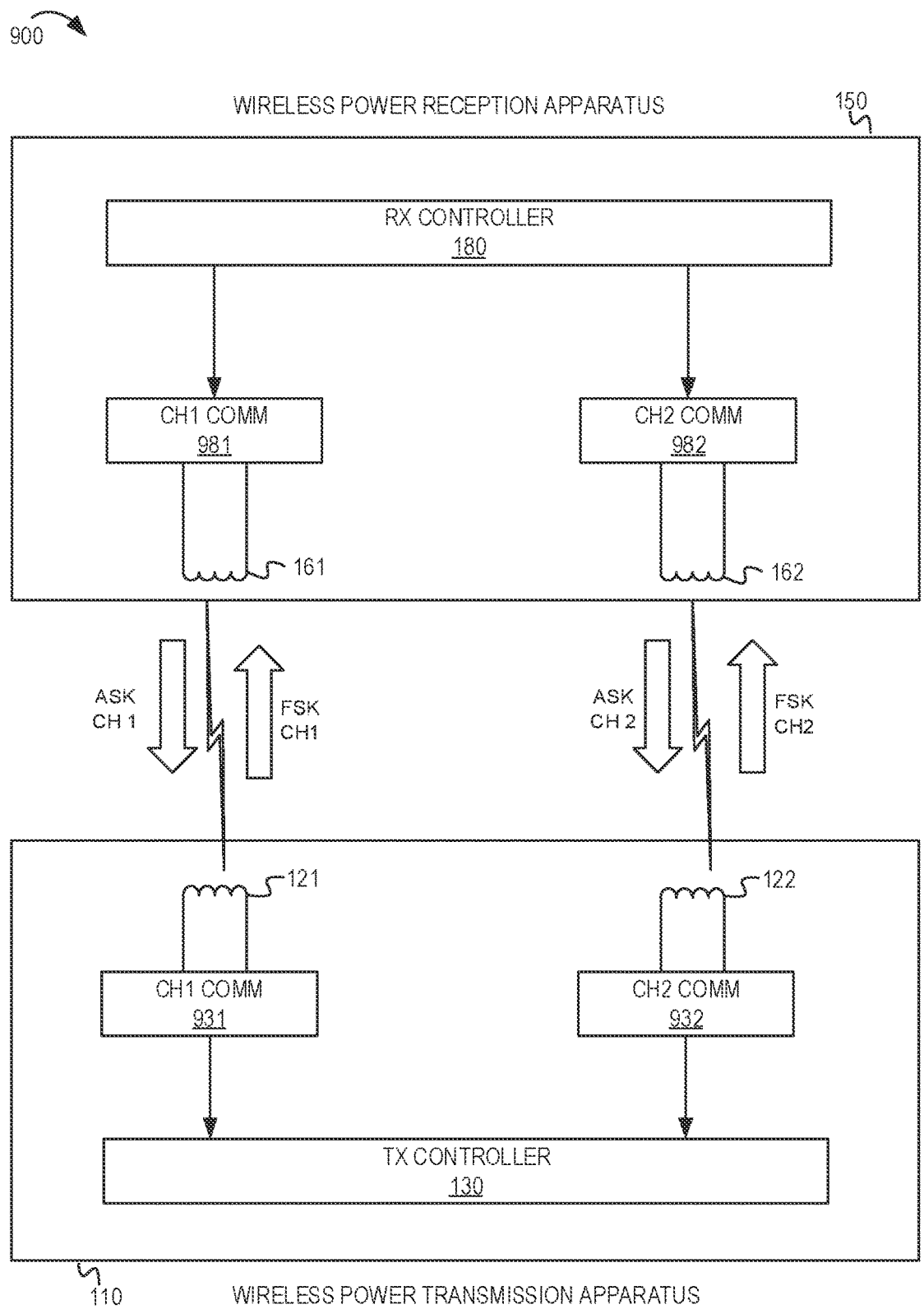
FIG. 9 shows another example which uses multiple communication channels between an example wireless power reception apparatus and an example wireless power transmission apparatus according to some implementations.

FIG. 9 shows another example 900 which uses multiple communication channels between an example wireless power reception apparatus 150 and an example wireless power transmission apparatus 110 according to some implementations. Each transmission coil pair (represented by a primary coil and a secondary coil) may create a communication channel. Such freedom may be available when each primary coil 121 and 122 has a separate power signal generator (such as separate drivers, not shown). Each channel may use ASK and FSK for backward and forward communications, respectively. For example, the first channel communication unit 931 of the wireless power transmission apparatus 110 may have an ASK demodulator and an FSK modulator. The first channel communication unit 981 of the wireless power reception apparatus 150 may have an ASK modulator and an FSK demodulator. Similarly, the second channel communication unit 932 of the wireless power transmission apparatus 110 may have an ASK demodulator and an FSK modulator. The second channel communication unit 982 of the wireless power reception apparatus 150 may have an ASK modulator and an FSK demodulator. The techniques for foreign object detection described with reference to FIG. 8 are also applicable to the example 800 in FIG. 9.

Figure 10:
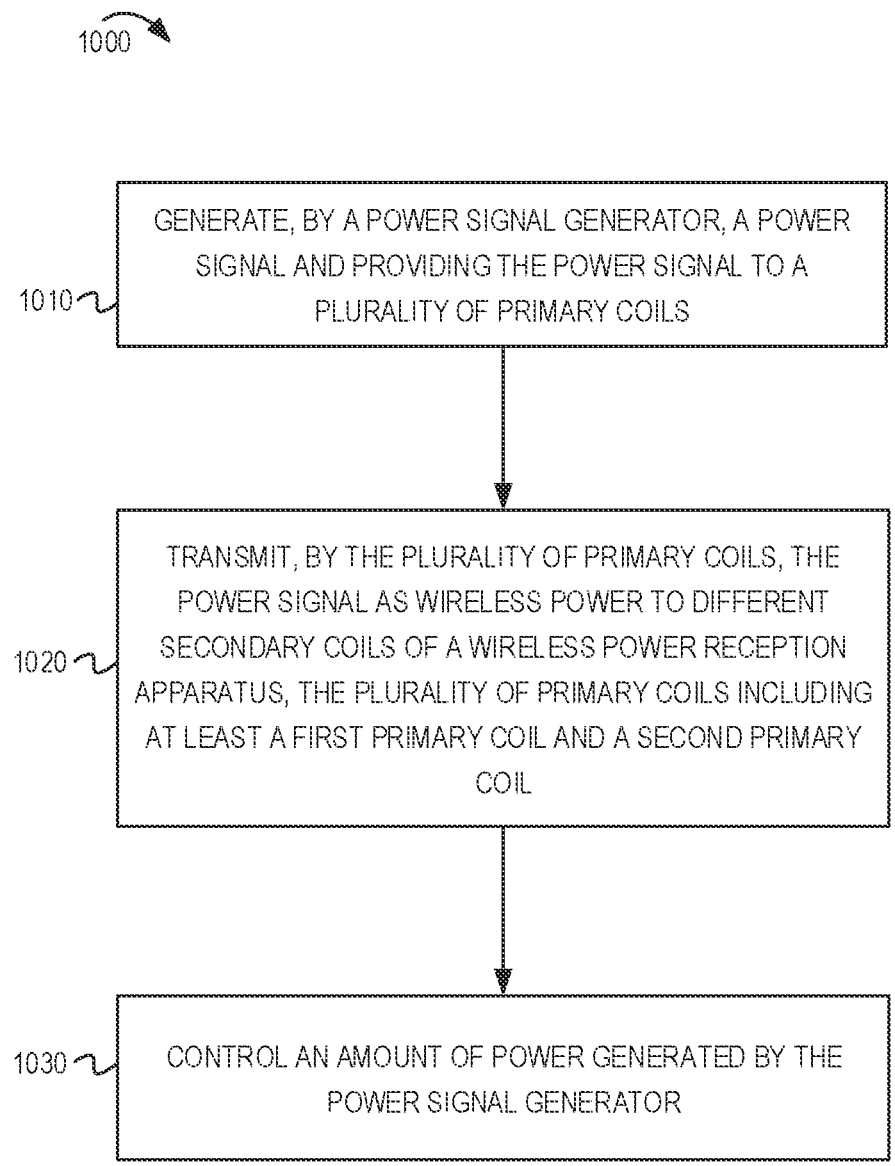
FIG. 10 shows a flowchart illustrating an example process for wireless power transmission according to some implementations.

FIG. 10 shows a flowchart illustrating an example process for wireless power transmission according to some implementations. The flowchart 1000 begins at block 1010. At block 1010, the process includes generating, by a power signal generator, a power signal and providing the power signal to a plurality of primary coils. At block 1020, the process includes transmitting, by the plurality of primary coils, the power signal as wireless power to different secondary coils of a wireless power reception apparatus, the plurality of primary coils including at least a first primary coil and a second primary coil. At block 1030, the process includes controlling an amount of power generated by the power signal generator.

Figure 11:
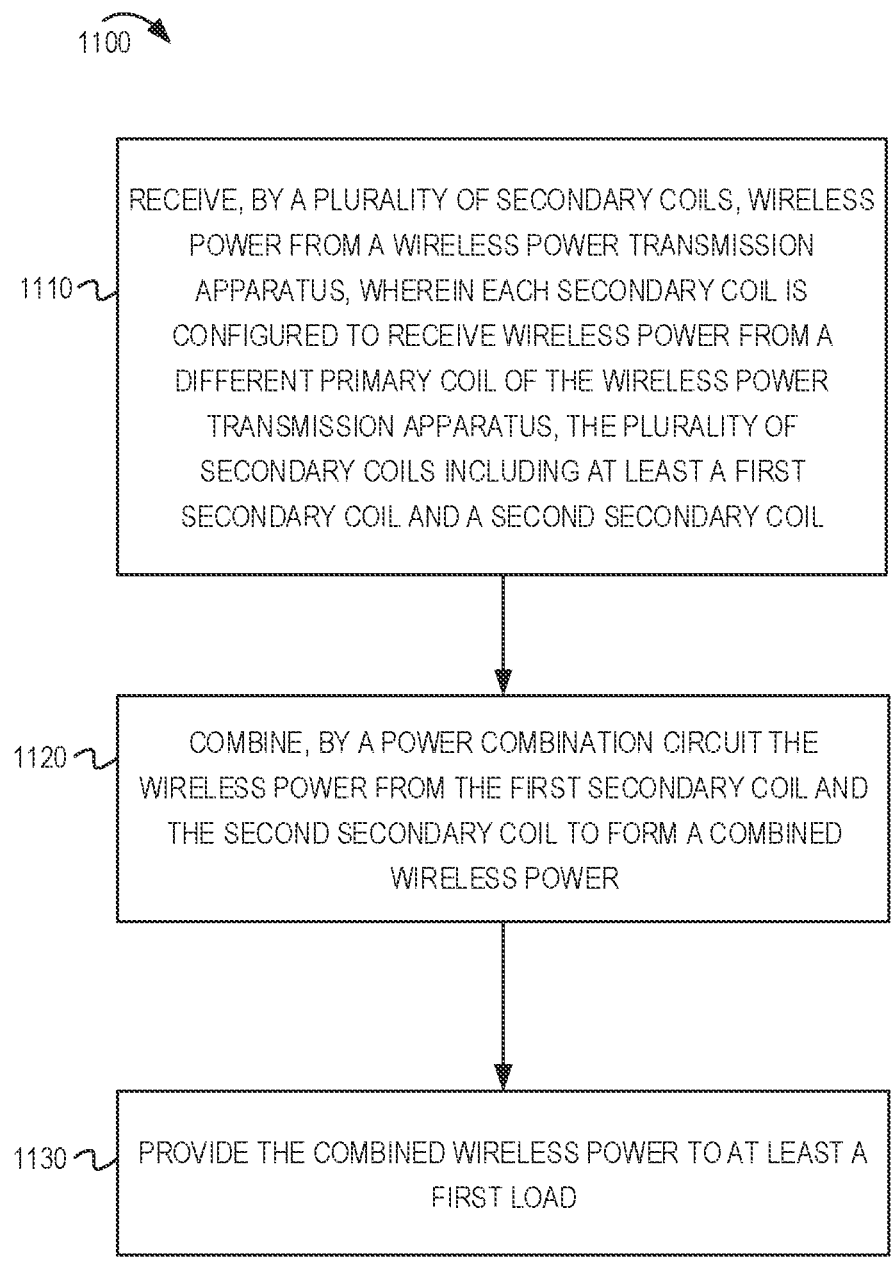
FIG. 11 shows a flowchart illustrating an example process for wireless power reception according to some implementations.

FIG. 11 shows a flowchart illustrating an example process for wireless power reception according to some implementations. The flowchart 1100 begins at block 1110. At block 1110, the process includes receiving, by a plurality of secondary coils, wireless power from a wireless power transmission apparatus. Each secondary coil is configured to receive wireless power from a different primary coil of the wireless power transmission apparatus, the plurality of secondary coils including at least a first secondary coil and a second secondary coil. At block 1120, the process includes combining, by a power combination circuit the wireless power from the first secondary coil and the second secondary coil to form a combined wireless power. At block 1130, the process includes providing the combined wireless power to at least a first load.

Figure 12:
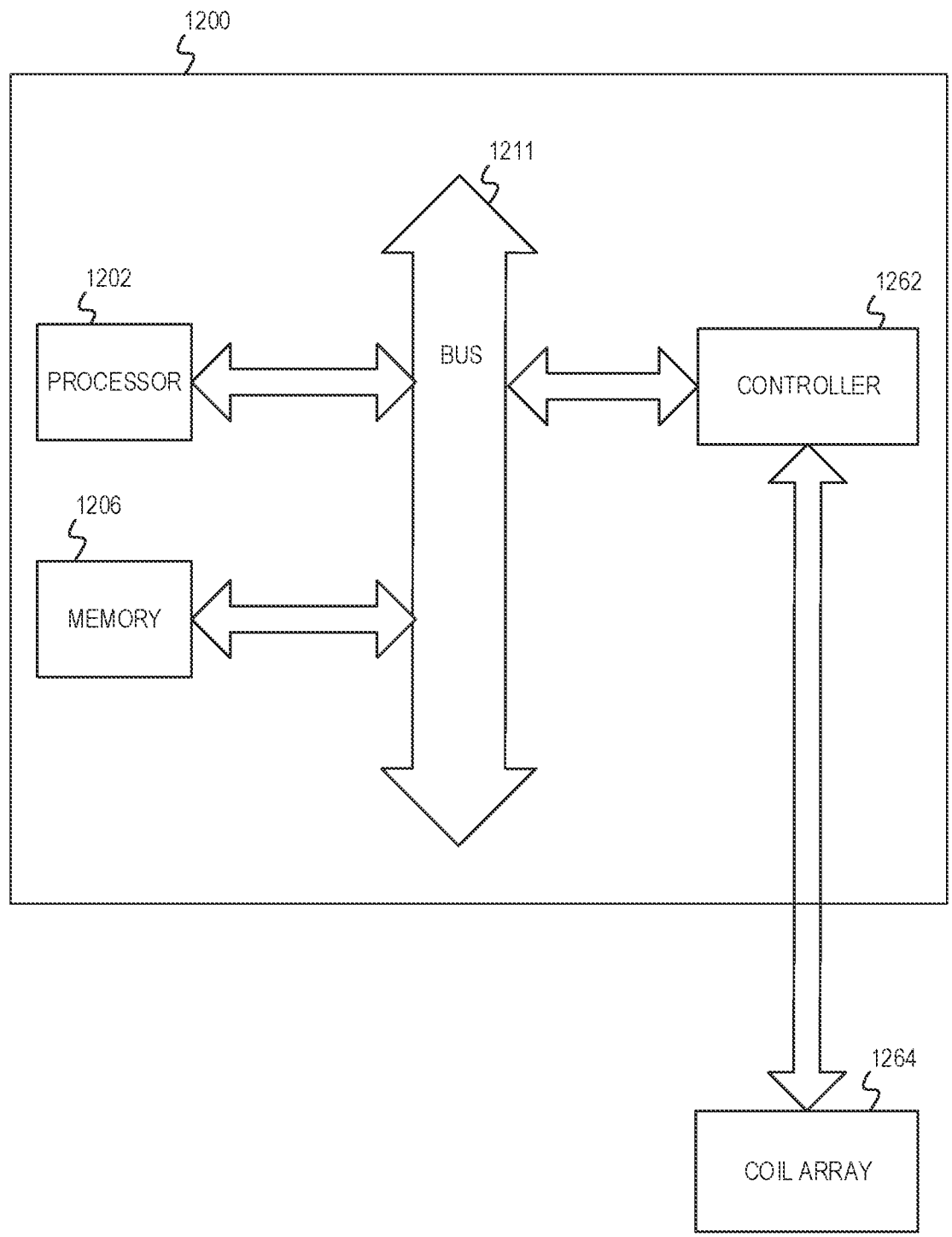
FIG. 12 shows a block diagram of an example apparatus for use in wireless power system according to some implementations.

FIG. 12 shows a block diagram of an example apparatus for use in wireless power system according to some implementations. In some implementations, the apparatus 1200 may be a wireless power transmission apparatus (such as the wireless power transmission apparatus 110) or a wireless power reception apparatus (such as the wireless power reception apparatus 150). The apparatus 1200 can include a processor 1202 (possibly including multiple processors, multiple cores, multiple nodes, or implementing multi-threading, etc.). The apparatus 1200 also can include a memory 1206. The memory 1206 may be system memory or any one or more of the possible realizations of computer-readable media described herein. The apparatus 1200 also can include a bus 1211 (such as PCI, ISA, PCI-Express, HyperTransport®, InfiniBand®, NuBus,® AHB, AXI etc.).

The apparatus 1200 may include one or more controller(s) 1262 configured to manage multiple primary or secondary coils (such as a coil array 1264). In some implementations, the controller(s) 1262 can be distributed within the processor 1202, the memory 1206, and the bus 1211. The controller(s) 1262 may perform some or all of the operations described herein. For example, the controller 1262 may be a TX controller, an RX controller, or both. The controller 1262 also may include one or more communication units (not shown) for modulation or demodulation of communications sent or received by the coil array 1264.

The memory 1206 can include computer instructions executable by the processor 1202 to implement the functionality of the implementations described in FIGS. 1-11. Any one of these functionalities may be partially (or entirely) implemented in hardware or on the processor 1202. For example, the functionality may be implemented with an application specific integrated circuit, in logic implemented in the processor 1202, in a co-processor on a peripheral device or card, etc. Further, realizations may include fewer or additional components not illustrated in FIG. 12. The processor 1202, the memory 1206, and the controller(s) 1262 may be coupled to the bus 1211. Although illustrated as being coupled to the bus 1211, the memory 1206 may be coupled to the processor 1202.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power transmission apparatus, comprising:
   a plurality of primary coils for transmission of wireless power to different secondary coils of a wireless power reception apparatus, the plurality of primary coils including at least a first primary coil and a second primary coil;
   a power signal generator electrically connected to the plurality of primary coils and configured to selectively provide power to the plurality of primary coils;
   at least one transmission (TX) controller coupled with the power signal generator and the plurality of primary coils, wherein the at least one TX controller is configured to control an amount of power provided by the power signal generator to the plurality of primary coils; and
   a plurality of communication units communicatively coupled with the at least one TX controller and configured to communicate with the wireless power reception apparatus, wherein each of the plurality of communication units correspond to a different one of the plurality of primary coils, and wherein a first communication unit of the plurality of communication units enables communication via at least a first communication channel at the first primary coil and a second communication unit of the plurality of communication units enables communication via a second communication channel at the second primary coil.

2. The wireless power transmission apparatus of claim 1, wherein:
   the first communication unit is configured to receive a first communication from the wireless power reception apparatus via the first communication channel at the first primary coil, and
   the second communication unit is configured to receive a second communication from the wireless power reception apparatus via the second communication channel at the second primary coil.

3. The wireless power transmission apparatus of claim 2, wherein the first communication and the second communication are received at different times.

4. The wireless power transmission apparatus of claim 2, wherein the first communication includes a first identifier for identifying the first communication channel, and wherein the second communication includes a second identifier for identifying the second communication channel.

5. The wireless power transmission apparatus of claim 2, wherein the at least one TX controller is configured to detect a foreign object at either the first primary coil or the second primary coil based, at least in part, on the first communication or the second communication, respectively.

6. The wireless power transmission apparatus of claim 5, wherein the at least one TX controller is configured to:
   determine a first quality factor (Q-factor) for the first primary coil;
   determine a second Q-factor for the second primary coil;
   obtain a first reference quality value from the first communication;
   obtain a second reference quality value from the second communication; and
   detect the foreign object based on either a first comparison of the first Q-factor with the first reference quality value or a second comparison of the second Q-factor with the second reference quality value.

7. The wireless power transmission apparatus of claim 5, wherein the at least one TX controller is configured to:
   obtain, from the first communication, a first received power metric regarding wireless power received from the first primary coil by a first secondary coil of the wireless power reception apparatus;
   obtain, from the second communication, a second received power metric regarding wireless power received from the second primary coil by a second secondary coil of the wireless power reception apparatus;
   determine a first transmitted power metric for the first primary coil;
   determine a second transmitted power metric for the second primary coil; and detect the foreign object based on either a first comparison of the first transmitted power metric with the first received power metric or a second comparison of the second transmitted power metric with the second received power metric.

8. The wireless power transmission apparatus of claim 3, wherein the at least one of the first communication unit or the second communication unit is further configured to transmit a third communication to the wireless power reception apparatus via either or both of the first primary coil and the second primary coil.

9. The wireless power transmission apparatus of claim 8, wherein the first communication and the second communication are received by demodulating amplitude load modulation signals, and wherein the third communication is transmitted by modulating the wireless power using frequency modulation.

10. The wireless power transmission apparatus of claim 9, wherein the amplitude load modulation signals include amplitude shift keying (ASK) modulation, and wherein the frequency modulation includes frequency shift keying (FSK) modulation.

11. The wireless power transmission apparatus of claim 1, wherein each primary coil is configured to produce an electromagnetic field for inductive transmission of wireless power not exceeding 15 Watts, and wherein the plurality of primary coils collectively enable wireless power transmission over 15 Watts.

12. The wireless power transmission apparatus of claim 1, wherein the plurality of primary coils includes at least four primary coils and the plurality of primary coils collectively enable wireless power transmission of at least 60 Watts.

13. The wireless power transmission apparatus of claim 1, further comprising:
one or more switches electrically coupled to at least one primary coil of the plurality of primary coils, wherein the one or more switches can be selectively opened by the at least one TX controller to disable at least one primary coil of the plurality of primary coils if the at least one primary coil is not transmitting wireless power to the wireless power reception apparatus or if a foreign object is detected between the at least one primary coil and the wireless power reception apparatus.

14. The wireless power transmission apparatus of claim 1, wherein each primary coil is compatible with a power class zero (PC0) rating, and wherein the plurality of primary coils collectively enable wireless power transmission for a power class one (PC1) rating.

15. The wireless power transmission apparatus of claim 14,
wherein the plurality of primary coils is configured to provide power via more than one primary coil when the wireless power reception apparatus has a PC1 rating power requirement, and
wherein the plurality of primary coils is configured to provide power via one primary coil when the wireless power reception apparatus has a PC0 rating power requirement.

16. The wireless power transmission apparatus of claim 15, further comprising:
the at least one TX controller being configured to identify whether the wireless power reception apparatus has the PC0 rating power requirement or the PC1 rating power requirement based, at least in part, on a communication received from the wireless power reception apparatus via at least one of the plurality of primary coils.

17. The wireless power transmission apparatus of claim 1, further comprising:
a charging surface associated with the plurality of primary coils; and
one or more alignment aids to increase a likelihood that a plurality of secondary coils in the wireless power reception apparatus will correspondingly align with the plurality of primary coils when the wireless power reception apparatus is placed on the charging surface.

18. A wireless power reception apparatus, comprising:
a plurality of secondary coils, wherein each secondary coil is configured to receive wireless power from a different primary coil of a wireless power transmission apparatus, the plurality of secondary coils including at least a first secondary coil and a second secondary coil;
a power combination circuit electrically coupled to the plurality of secondary coils and configured to combine the wireless power from the first secondary coil and the second secondary coil and provide the combined wireless power to at least a load;
a receive (RX) controller coupled with the power combination circuit and the plurality of secondary coils; and
a plurality of communication units communicatively coupled with the RX controller and configured to communicate with the wireless power transmission apparatus, wherein each of the plurality of communication units correspond to a different one of the plurality of secondary coils, and wherein a first communication unit of the plurality of communication units enables communication via at least a first communication channel at the first secondary coil and a second communication unit of the plurality of communication units enables communication via a second communication channel at the second secondary coil.

19. The wireless power reception apparatus of claim 18, wherein:
the first communication unit is configured to transmit a first communication to the wireless power transmission apparatus via the first communication channel at the first secondary coil, and
the second communication unit is configured to transmit a second communication to the wireless power transmission apparatus via the second communication channel at the second secondary coil.

20. The wireless power reception apparatus of claim 19, wherein the first communication and the second communication are transmitted at different times.

21. The wireless power reception apparatus of claim 20, wherein the first communication includes a first identifier for identifying the first communication channel, and wherein the second communication includes a second identifier for identifying the second communication channel.

22. The wireless power reception apparatus of claim 19, wherein the first communication includes a first received power metric regarding wireless power received from a first primary coil of the wireless power transmission apparatus by the first secondary coil, and wherein the second communication includes a second received power metric regarding wireless power received from a second primary coil of the wireless power transmission apparatus by the second secondary coil.

23. The wireless power reception apparatus of claim 19, wherein at least one of the first communication unit or the second communication unit is further configured to receive a third communication from the wireless power transmission apparatus via either or both of the first secondary coil and the second secondary coil.

24. The wireless power reception apparatus of claim 23, wherein the first communication and the second communication are transmitted by modulating amplitude load modulation signals, and wherein the third communication is received by demodulating the wireless power using frequency modulation.

25. The wireless power reception apparatus of claim 24, wherein the amplitude load modulation signals include amplitude shift keying (ASK) modulation, and wherein the frequency modulation includes frequency shift keying (FSK) modulation.

26. The wireless power reception apparatus of claim 18, wherein each secondary coil is configured to receive wireless power not exceeding 15 Watts via an electromagnetic field produced by a different primary coil of the wireless power transmission apparatus, and wherein the plurality of secondary coils collectively receive wireless power over 15 Watts.

27. The wireless power reception apparatus of claim 18, wherein the plurality of secondary coils includes at least four secondary coils and the plurality of secondary coils collectively receive wireless power of at least 60 Watts.

28. The wireless power reception apparatus of claim 18, wherein each secondary coil is compatible with a power class zero (PC0) standard specification, and wherein the plurality of secondary coils collectively receive wireless power for a power class one (PC1) standard specification.

29. The wireless power reception apparatus of claim 18, further comprising:
  a housing for the plurality of secondary coils, the housing configured to attach to an electronic device, wherein the load includes a battery charger of the electronic device.

30. The wireless power reception apparatus of claim 18, further comprising:
  one or more alignment aids to increase a likelihood that the plurality of secondary coils will correspondingly align with a plurality of primary coils associated with a charging surface of the wireless power transmission apparatus when the wireless power reception apparatus is placed on the charging surface.

31. The wireless power transmission apparatus of claim 1, wherein the at least one TX controller comprises a plurality of TX controllers.

* * * * *